United States Patent [19]
Klein et al.

[11] Patent Number: 5,517,878
[45] Date of Patent: May 21, 1996

[54] HANDLEBAR TO STEERER CLAMPING DEVICE FOR BICYCLES

[75] Inventors: Gary G. Klein; Darrell W. Voss, both of Chehalis, Wash.

[73] Assignee: Klein Bicycle Corporation, Chehalis, Wash.

[21] Appl. No.: 105,578

[22] Filed: Aug. 13, 1993

[51] Int. Cl.⁶ .............................. B62K 21/16; B25G 3/20
[52] U.S. Cl. .......................................... 74/551.3; 403/371
[58] Field of Search ............................... 74/551.6, 551.3; 403/371, 326

[56] References Cited

U.S. PATENT DOCUMENTS

| | | | |
|---|---|---|---|
| 618,639 | 1/1899 | Bullard | 403/371 |
| 757,154 | 4/1904 | Tate | 74/551.6 |
| 4,405,251 | 9/1983 | Kolchinsky et al. | 403/326 |

*Primary Examiner*—Rodney H. Bonck
*Assistant Examiner*—Sherry Estremsky
*Attorney, Agent, or Firm*—Jim Zegeer

[57] ABSTRACT

A lightweight handlebar/steerer locking mechanism for use on road and mountain bicycles. The invention provides higher fatigue and impact resistance, lower material and production costs, and improved adjustability, compared to prior art designs, all at a reduced weight.

The superior structural performance of the invention is provided by a unique, 3-dimensional, sliding, compression wedge. The 3-dimension wedge improves the stress distributions within the device my introducing a more uniform wedging (locking) action on the circumference of the steerer tube. This allows the mating parts to be designed lighter, thereby reducing the total weight of the assembly. The configuration of the design also lends itself to modern metal working methods. This further improves the strength of the parts by increasing the material allowables. Also, these metal working operations help to reduce material scrap, thus reducing material costs.

The invention improves the adjustability of the handle-bar assembly by allowing the locking and un-locking function to be accomplished by hand, without any assistance from a special tool. The locking function is activated and de-activated by the twisting of a tightening cap. This can be done by hand, from the sitting position of the bicycle rider.

9 Claims, 8 Drawing Sheets

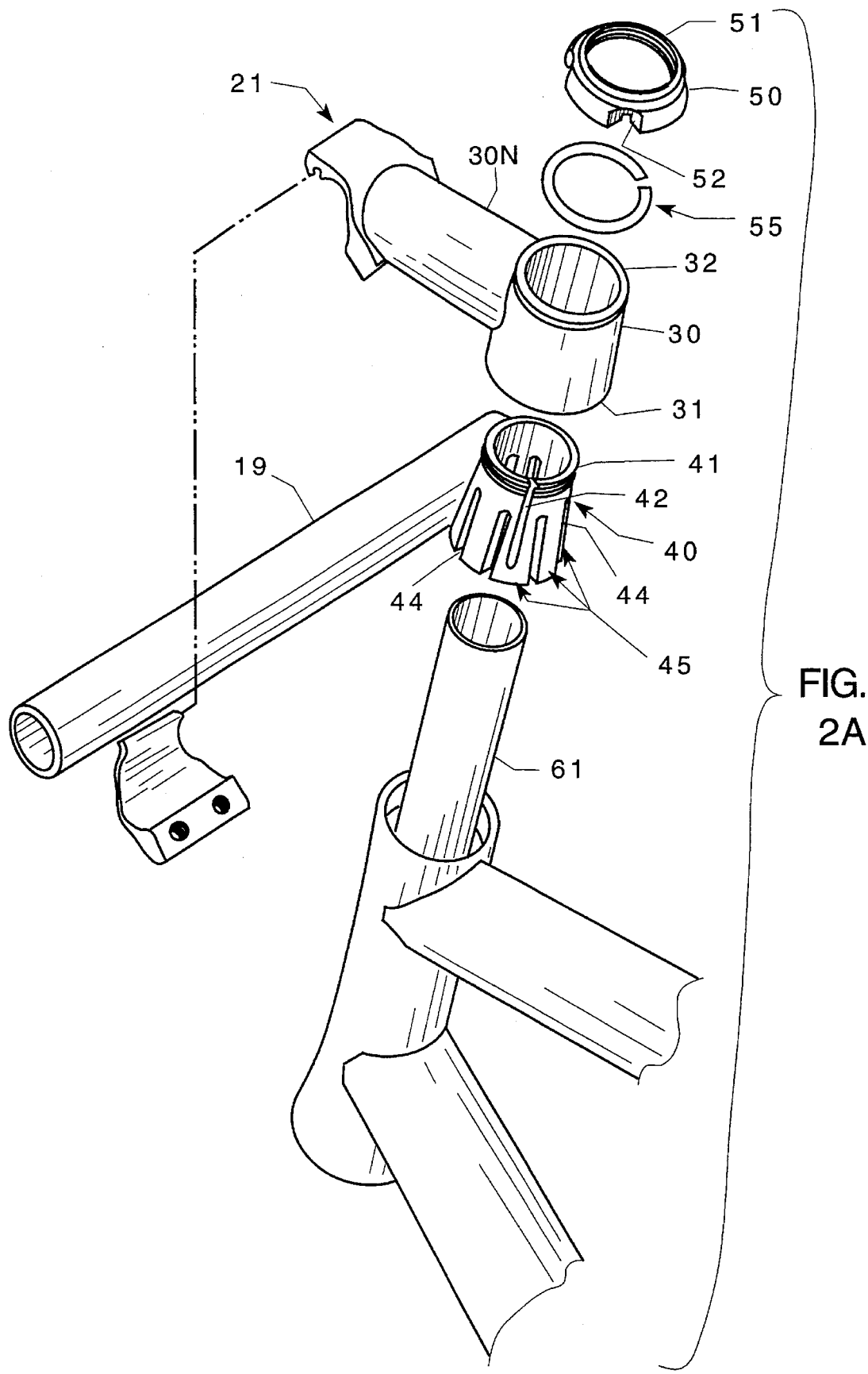

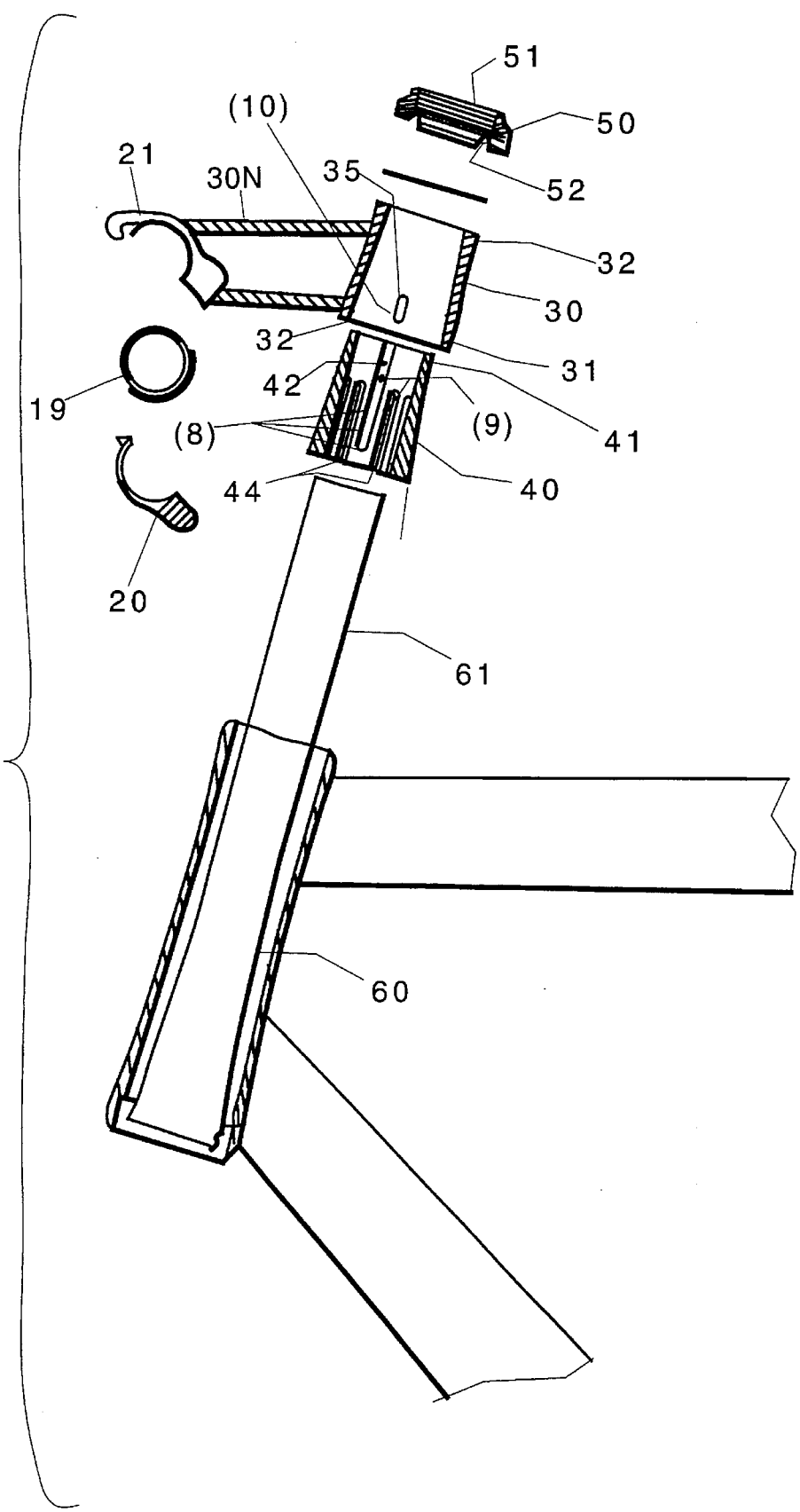

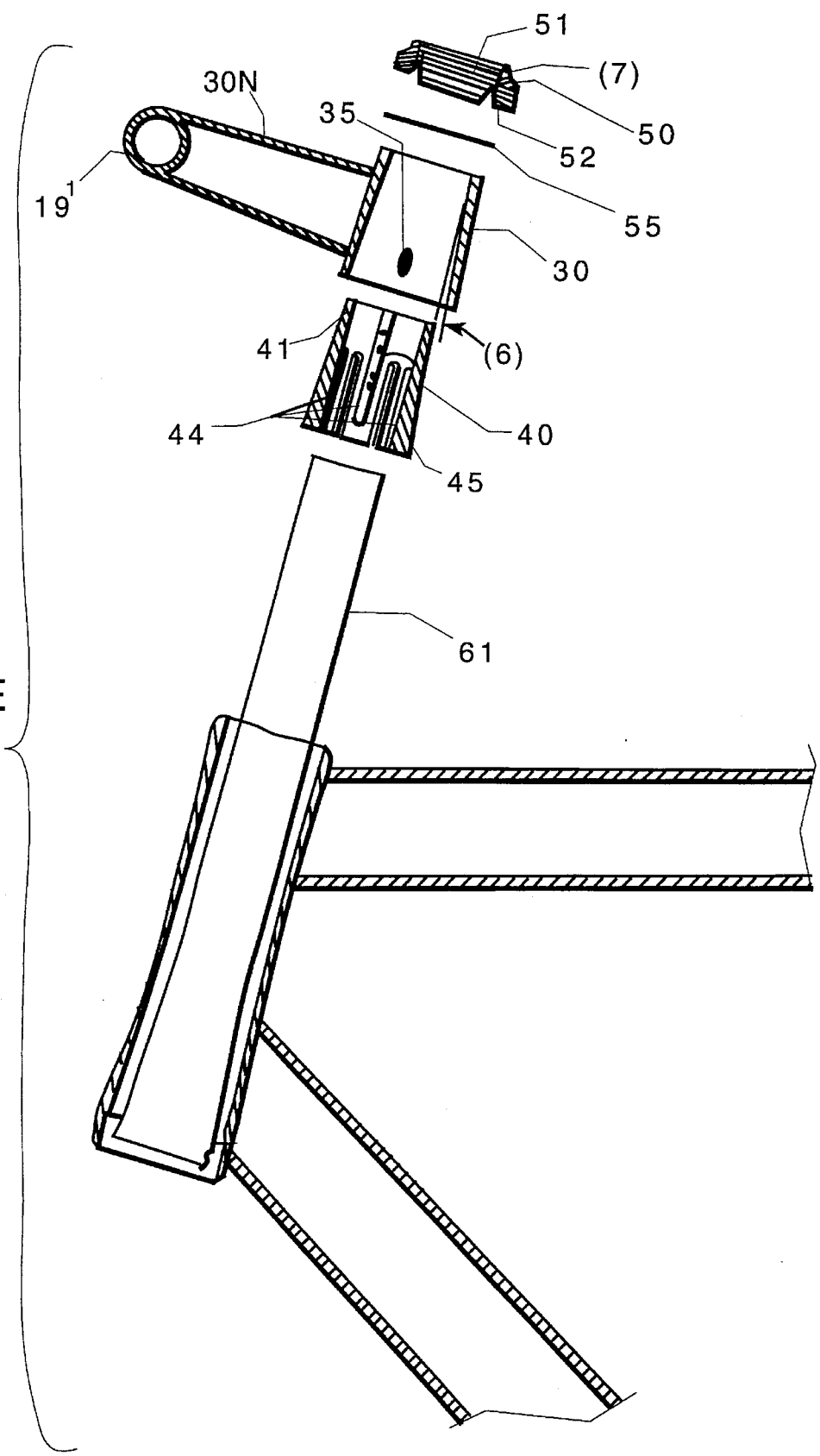

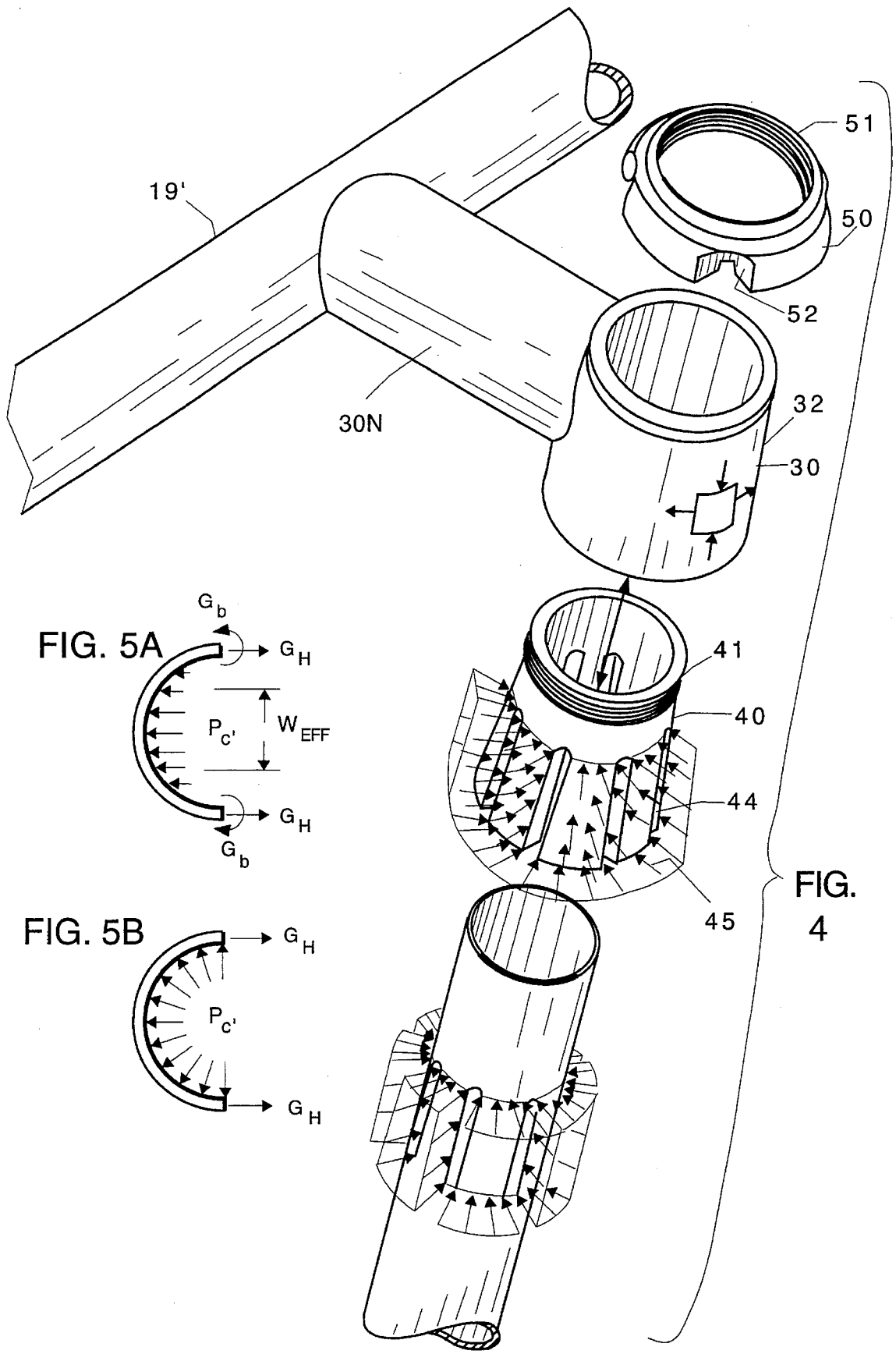

HANDLEBAR TO STEERER CLAMPING DEVICE FOR BICYCLES

REFERENCE TO RELATED APPLICATIONS

This application is related to an application filed contemporaneously herewith entitled "AN IMPROVED SEATPOST CLAMPING DEVICE FOR BICYCLES", U.S. Ser. No. 08/105,579.

INTRODUCTION

This invention relates to an improved handle-bar to steerer clamping device for bicycles. The disclosed design offers superior strength, lower material weight and cost, lower production costs, and improved adjustability compared to conventional prior art designs.

BACKGROUND

Bicycle handlebars and their supporting structure are exposed to relatively severe impact loads. This is particularly true for competition mountain bicycles. In a rough off-road environment, handlebar impact loads in excess of 500 lbf can occur. This level of loading imposes severe structural demands on the handlebar clamping mechanism. Also, in competition riding, the ease (hence, speed) with which the handlebar assembly can be adjusted (or replaced) is important.

Current handlebar clamping methods are not very efficient. They tend to be relatively heavy and bulky and are not easily adjusted without the use of special tools. To the serious competition bicyclist, these are important factors in the design. Prior art systems are also relatively expensive to produce. Some require labor intensive welding operations. Other require a number of precision machining steps. Many of the prior art are produced from (or partially from) solid bar stock. This results in a considerable amount of material waste and an excessive amount of machine and labor time for the tooling operations.

The primary objectives of this invention are to provide a handlebar to steerer clamping device which: 1) improve the fatigue characteristics of the handle-bar to steerer connection, 2) reduces material weight and cost, 3) reduces manufacturing costs and 4) improves the adjustability of the handle-bar assembly.

PRIOR ART DESIGN

FIG. 1A illustrates a common method in use today for connecting a handle-bar assembly of a bicycle to the main frame structure. Actually, the connection is made via the steerer tube of the front fork assembly. The front fork assembly then, in turn, is directly coupled to the frame by the head-set bearings, located in the head-tube (not shown in FIG. 1). The handle-bar connection includes the handlebar neck (1), the stem-post (2), the fork steerer tube (3), a stem bolt (4) and a compression wedge (5). The stem-to-steerer connection is a tube-in-socket arrangement with the stem-post sliding freely inside of the steerer tube, until the clamping mechanism is activated and the stem-post locked securely into position.

The method used for locking the stem-post to the steerer tube consists basically of tightening the stem bolt, which in turn pulls the compression wedge along a ramped or cam surface (6). This movement causes the wedge to "jam" itself between the inside surface of the steerer tube and the ramped surface, effectively locking the stem-post to the steerer tube.

For the illustrated prior art system, the wedging action is two dimensional. That is, only one ramped surface exists in the design, and for any axial movement of the wedge, the expanding action occurs in only one direction, relative to the ramped surface. As a result, the hoop stresses induced within the steerer tube are non-uniform, both in the circumferential (see the sectional view in FIG. 1B) and in the axial direction. Localized bending stresses are introduced as well. Also, to obtain the ramped surfaces on the stem-post and the compression wedge, a portion of each part is cut away. This not only wastes material but it also breaks the hoop continuity in the area of the ramp, resulting with higher stresses in the region.

The present invention provides a more efficient design and incorporates a three dimensional (annular) wedge where the "jamming" action of the wedge occurs uniformly along and around the circumference of the steerer tube, thereby inducing a more uniform hoop stress distribution within the steerer tube, with very little localized bending stresses.

The invention features an externally accessible, internally threaded tightening cap which is rotatably retained in fixed position on a handlebar neck/crown by a retaining clip. A multi-fingered annular compression wedge or collet is threadably engaged with the threads of the tightening cap to axially translate the annular compression wedge and its fingers in the neck/crown. An annular ramp or cam surface formed internally in the neck/crown cam is engaged by the cooperating ramp or cam surfaces on each finger of the annular compression wedge or collet.

BRIEF DESCRIPTION OF THE DRAWINGS

The above and other objects, advantages and features of the invention will become more apparent in view of the following specification and accompanying drawings herein:

FIG. 2A is an exploded 3-dimensional view of the invention for road bicycle applications, FIG. 2B is an exploded 2-dimensional section view of the invention for road bicycle applications, FIG. 3B is an exploded 2-dimensional section view of the invention for mountain bicycle applications, FIG. 4 is an exploded 3-dimensional view of the invention, illustrating the locking loads created by a 3-dimensional wedge, FIGS. 5A and 5B are side-by-side stress diagrams of the prior art (FIG. 5A) and the present invention (FIG. 5B).

DETAILED DESCRIPTION OF THE INVENTION

Figure 1:
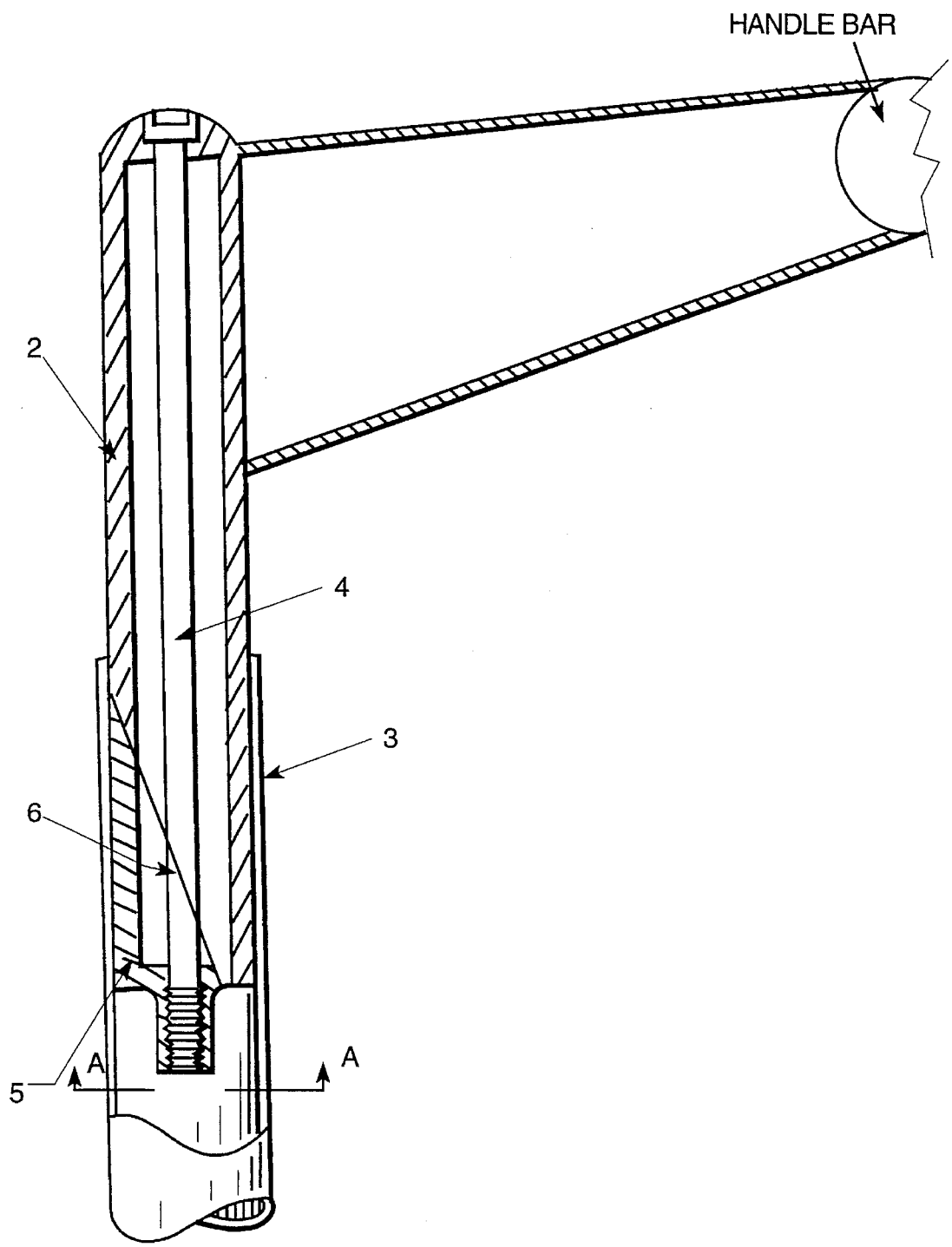
FIG. 1 is an illustration of a typical prior art handle-bar stem/steerer clamping mechanism commonly used by the bicycle industry today.

The invention disclosed herein is described in FIGS. 2A, 2B, 3, 3B and 3C. Two embodiments are illustrated in these figures. The embodiment illustrated in FIGS. 2A and 2B disclose road bicycle applications and the embodiment in FIGS. 3A and 3B disclose mountain bicycle applications. The main difference in the two embodiments is that in the road bicycle the handle bar 19 is connected to the handle-bar neck by a clamp 20, 21. For the mountain bicycle design, the handle-bar 19' is welded directly to the neck. The two embodiments are fundamentally the same in other respects, except for tubing sizes and material thicknesses.

The invention includes a neck crown 30 welded to neck 31, a multi-fingered compression wedge 40, a tightening cap 50 and a retaining clip 55. Neck crown 30 is flared at its bottom end 31 to accommodate the locking mechanism. The locking mechanism in this embodiment is 3-dimensional compression wedge 40, made from a metallic or non-metallic (e.g., reinforced plastic) material. Tightening cap or actuator 50 includes an internally threaded portion 51 for threaded engagement with externally threaded portion 41 on the upper end of multi-fingered compression wedge 40. An internal annular groove 52 in cap 50 receives stainless steel retaining clip 55 which also seats in an external annular groove 32 formed in the upper end of crown 30. Tightening cap 50 is of relatively large diameter and provided with formations or flats to receive a wrench or be tightened by hand, if desired.

The internal annular surface 33 is conical and flared downwardly so as to receive multi-fingered compression wedge 50. One or more rotation detent(s) 35 is formed on the annular surface 33 and fits or slides within upwardly opening hoop relief slot 42 to prevent rotation of compression wedge 40 and guide compression wedge 40 in axial translation.

Compression wedge 40 has an internal bore having a diameter such that steerer can be slid therethrough. As noted above, the upper end of compression wedge 40 has a threaded portion 41 which is threadably engaged with the internal threads 51 of tightening cap 50 so that rotation of tightening cap 51 effects axial translation of compression wedge 50 relative to the internal annular surface 33. Compression wedge 40 is preferably provided with a plurality hoop relief slots 44 to form a plurality of fingers 45 or wedge compression beams.

The upper end 61 of steerer 60 telescopes within compression wedge 40 and projects through tightening cap 50 with any excess steerer tube removed and a steerer tube end closure fitment (not shown) applied. The fork crown and fork blades are not shown. The head set bearing system can be of the type shown in Klein U.S. Pat. No. 5,002,297.

During the locking function, the compression wedge 40 becomes forced between the inner conical or ramped surface 33 of the neck crown 30 and the outer surface of the steerer 61. The wedge compression beams 45 are forced against and retracted from the steerer outer surface 61 by the axial movement of the compression wedge 40 against the ramped inner surface 33 of the neck crown 30. The coacting ramp surfaces may be coated with a solid lubricant such as PTFE to enhance operation. The pulling action on the compression wedge, inside of the neck crown, creates the frictional "locking" force. The wedge is pulled into (and pushed from) the locking position by a threaded tightening cap 50, which may be made from a metallic or a non-metallic material. The compression wedge is provided with hoop relief slots (9) to improve the clamp pressure distribution along the grip. The hoop relief slots 44 forming the fingers or wedge compression beams 45 allow more free hoop movement of the wedge along the grip, making the locking pressure more uniform. Also, one or more rotation preventing detent(s) 35 is provided in the neck crown to prevent the compression wedge from rotating while turning the tightening cap.

Figure 1B:
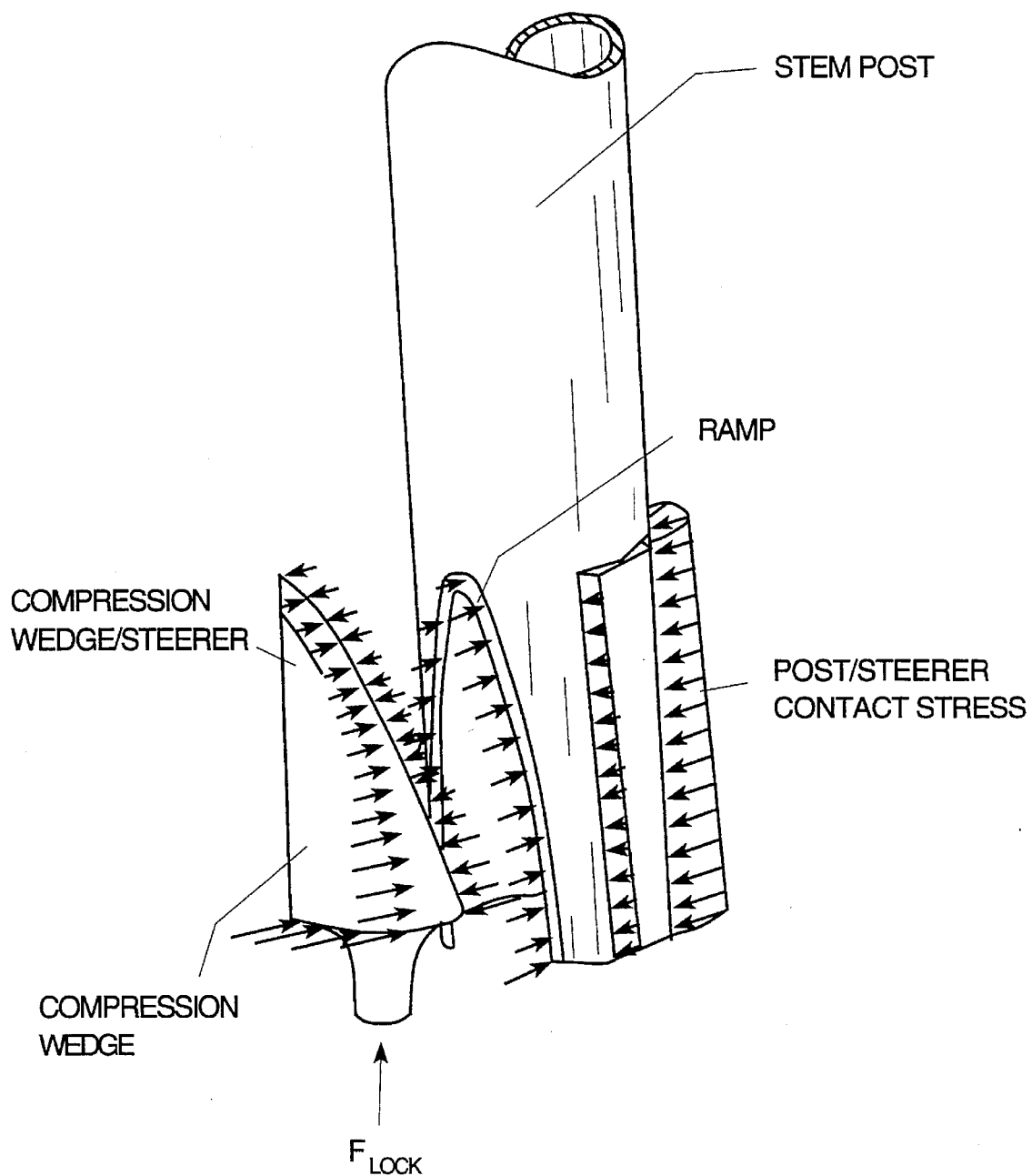
FIG. 1B illustrates the non-uniform stress distribution for a prior art stem/steerer clamp design.

The invention does away with the conventional stem-post arrangement shown in FIG. 1. This eliminates the need for some of the labor intensive welding operations, required by some of the prior art designs, and the need for the expensive "hogging" or "sculpturing" operations required to produce the parts from solid bar stock. The resulting structure is very "clean", free from the hoop discontinuities found in the prior art designs. This allows key structural parts of the invention to work near their full hoop strength capability without introducing serious fatigue cracking problems from localized bending stresses. With the use of a 3-dimensional wedge design, the resulting stress distribution within the steerer tube and the neck crown are fairly uniform (see the section view in FIG. 1B) and relatively free from bending stresses.

The invention also lends itself to modern metal forming methods for production. These production methods help to reduce material waste, improve the material strength properties of the key structural parts and eliminate costly labor and machine intensive operations.

FIGS. 2B and 3B show a sectional view of the concept for two applications. The angle of the wedge and the flared end of the seat-tube (6) is between 0.5 degrees and 15 degrees with the optimum angle probably in the 4–7 degree range, depending on the wedge material used.

The threaded portion of the wedge and the tightening cap (7) has a standard thread at 12–50 threads per inch, the optimum probably around 24 threads per inch.

Figure 3A:
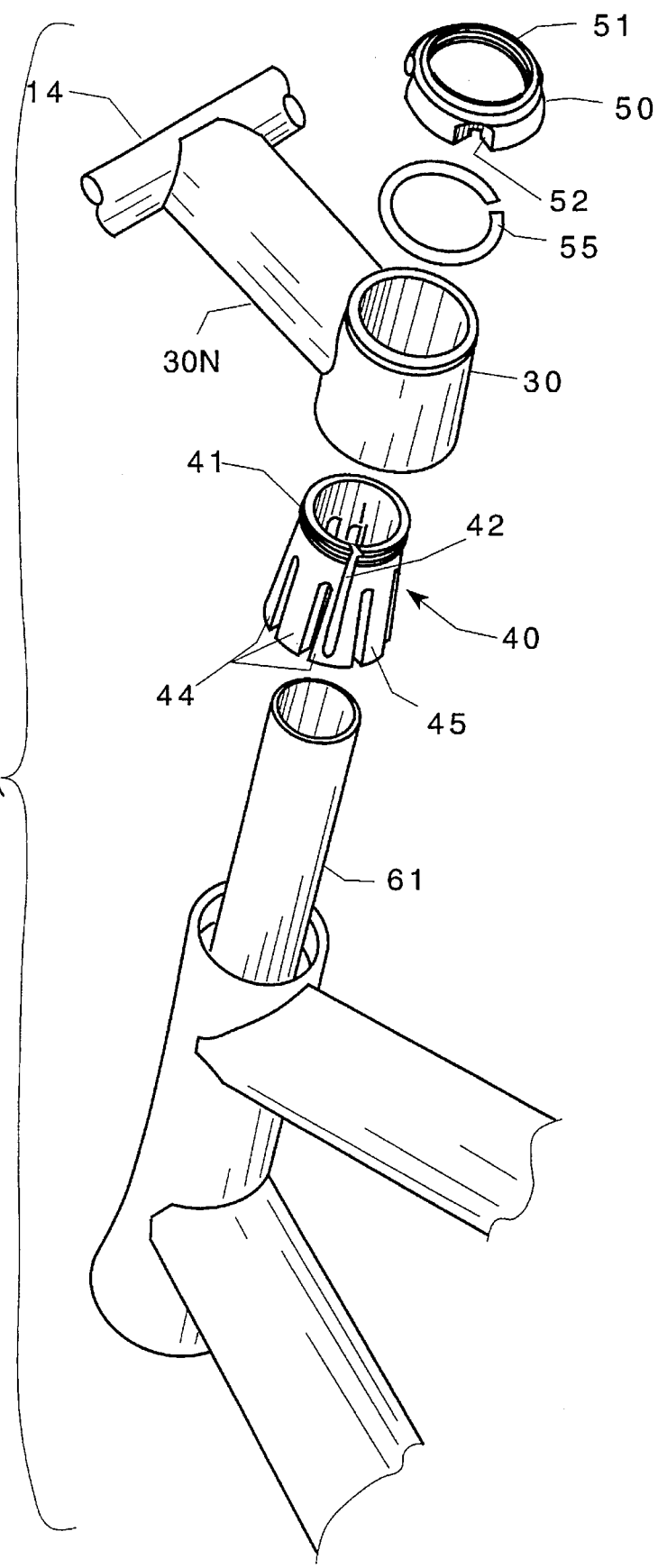
FIG. 3A is an exploded 3-dimensional view of the invention for mountain bicycle applications.
Figure 3C:
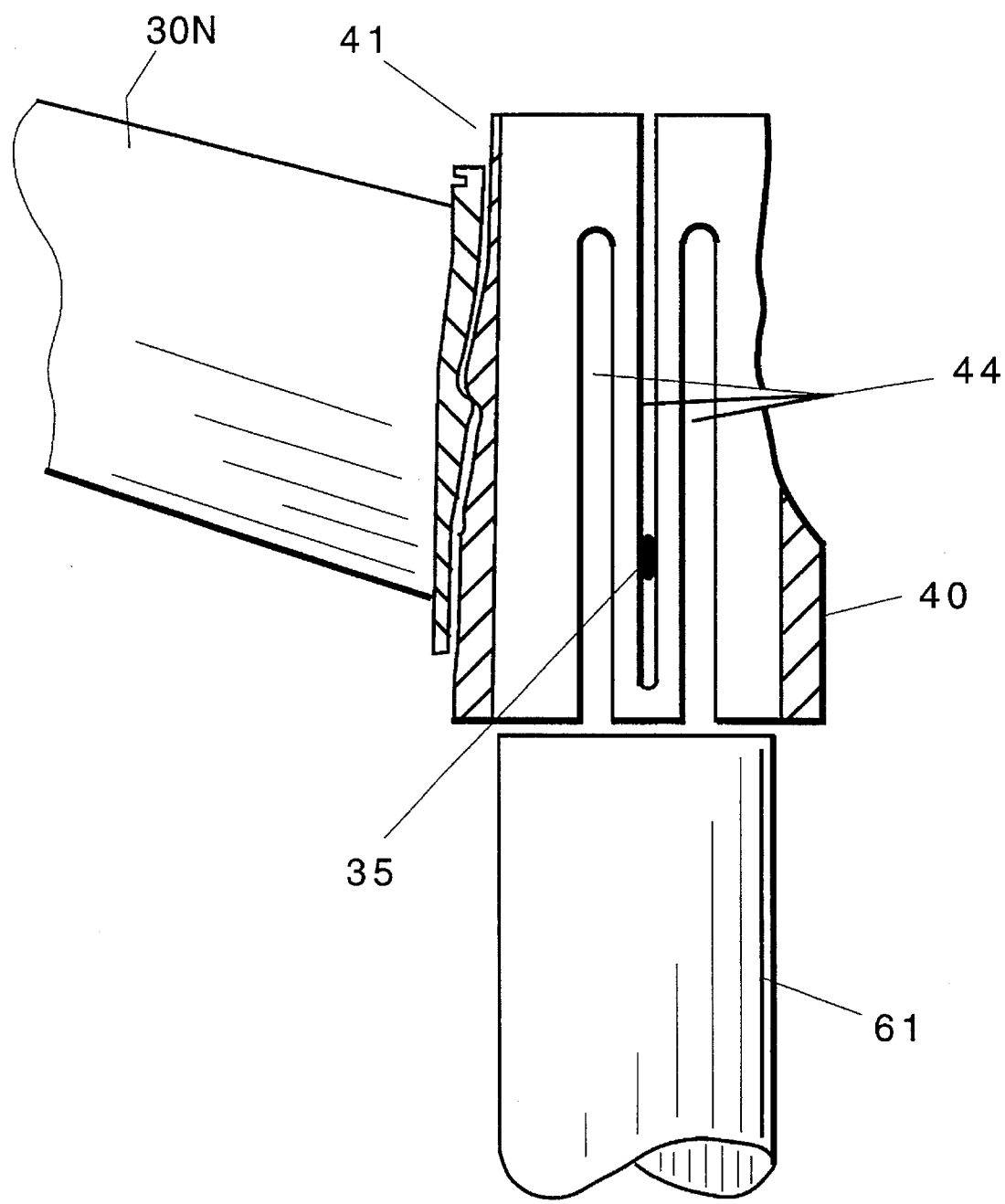
FIG. 3C is a section view of the invention showing an optional multi-ramp compression wedge design.

FIG. 3C illustrate an optional multi-ramp design for the compression wedge. This design consists of two or more wedge ramps to achieve the locking function. This design allows the device to achieve greater grip strength for a given diameter of the crown.

Structural Considerations

The structural enhancements provided by the invention are a result of the unique 3-dimensional compression wedge used to accomplish the locking function. FIG. 4 illustrate the function of the compression wedge in the design and the resulting locking loads. As the name implies, the compression wedge works under compression, generating compression locking forces on the steerer (and tension loads in the neck crown) when pulled into the "lock" position. The locking forces are a result of the "wedging" action between the neck crown and the steerer.

The locking forces are relatively uniform over the contact area of the wedge and, because of the 3-dimensional geometry of the wedge, these forces are close to being true radial loads. This is unlike the loads generated by the 2-dimensional wedge in the prior art designs. The 2-dimensional wedge application cannot develop true radial loads. Consequently, for these designs, static equilibrium is achieved in the key structural parts by the introduction of secondary bending stresses. These secondary bending stresses are detrimental to the fatigue life of the assembly.

The radial locking loads of a 3-dimensional wedge give nearly pure hoop stresses in the steerer and neck crown, with very little localized bending. This is the best possible loading for these parts. The "nearly" pure hoop stresses has to do with the fact that the wedge loads occur in discontinuous patches (see FIG. 4), as opposed to being uniformly distributed as is the case for a pure pressure loading. Therefore, the resulting hoop stresses will be slightly non-uniform, with some level of localized bending introduced. However, the stresses will be much more uniform and will contain considerably less bending than the prior art designs using a 2-dimensional wedge. See the comparison in FIGS. 5A and 5B.

While preferred embodiments of the invention have been shown and described, it will be appreciated that various modifications and adaptations of the invention will be apparent to those skilled in the art.

What is claimed is:

1. A handlebar locking mechanism for bicycles having a head tube through which passes a steerer tube on a fork assembly, a crown secured to a neck and said handlebar, comprising said crown having an internal conical ramp surface, a tightening actuator cap having a threaded internal surface, aligned grooves in said cap and crown and a retaining clip member seated in said aligned grooves in said cap and crown, respectively a rotatably coupling said cap to said crown, a 3-dimensional compression wedge having a plurality of internal gripping surfaces surrounding said steerer tube, and a threaded external surface threadably engaged with said threaded internal surface, wherein the compression wedge is linearly translated into position by the rotating action of a tightening cap, to accomplish the locking function.

2. The handlebar locking mechanism defined in claim 1 wherein said wedge contains a plurality of compression beams which are pressed against said steerer tube during the locking operation.

3. The handlebar locking mechanism defined in claim 2 wherein the compression beams include a wedged shaped section with an angle of 0.5 to 15 degrees.

4. A handlebar/steerer tube locking mechanism for bicycles including a neck crown, said neck crown having an internal annular surface formed to accommodate said locking mechanism, said internal annular surface being flared and making an angle of 0.5 degrees to 15 degrees relative to the axis of said neck crown, a cap member having internal threads, aligned grooves in said cap and neck crown, clip means seated in said aligned grooves and rotatably coupling said cap member with said neck crown, and an annular slotted compression wedge having threads threadably engaged with said internal threads of said cap member for linearly translating said compression wedge relative to said internal annular surface on said neck crown and cause said compression wedge to circumferentially engage said steerer tube.

5. The handlebar/steerer locking mechanism as defined in any one of claims 1, 2, 3 or 4 including hoop relief slots in said locking mechanism to improve the distribution of the grip pressure on said steerer tube.

6. The handlebar/steerer locking mechanism as defined in any one of claims 1, 2, 3 or 4 including a detent means to prevent said compression wedge from rotating when turning said tightening cap.

7. The handlebar/steerer locking mechanism as defined in any one of claims 1, 2, 3 or 4 including coacting multi-ramp surfaces on said compression wedge and said crown, respectively.

8. A hand operated handlebar locking mechanism for bicycles having a steerer tube passing through a head tube, comprising a handlebar crown having an upper end, and a lower end an internal conical ramp surface and an external surface, and an external groove in said external surface near said upper end, a three-dimensional compression wedge having an upper externally threaded end and a plurality of gripping surfaces for surrounding said steerer tube, a hand operated tightening actuator cap having an internal groove, a threaded internal surface threadably engaged with said upper externally threaded end of said compression wedge, and an annular retaining clip seated in said internal and external grooves.

9. The locking mechanism defined in claim 8 wherein there are about 24 threads per inch in said threaded internal surface and upper externally threaded end.

* * * * *